Patented May 11, 1943

2,319,012

UNITED STATES PATENT OFFICE 2,319,012

DIMETHYL-CYCLOPENTANO - POLYHYDRO-PHENANTHRENE COMPOUNDS AND PROCESS OF MAKING SAME

Karl Miescher, Riehen, and Albert Wettstein, Basel, Switzerland, assignors to Ciba Pharmaceutical Products, Incorporated, Summit, N. J., a corporation of New Jersey No Drawing. Application December 20, 1940, Serial No. 371,058. In Switzerland December 19, 1939

3 Claims. (Cl. 260—397.3)

It is known that saturated or unsaturated substituted polynuclear ring-ketones may be obtained by the following process: Nuclear saturated or unsaturated sterols or bile acids, their derivatives or degradation products, containing secondary nuclear hydroxyl groups—particularly in 3-position—as well as, if desired, nuclear double bonds protected from the oxidizing action, the former by substitution and the latter by temporary saturation, are treated with oxidizing agents, the polynuclear ring-ketones are removed from the neutral, non-volatile oxidation products obtained and, if desired, ester groups or the like which may be present are reconverted into the hydroxyl group.

Furthermore oxidation products of the cyclopentano-polyhydrophenanthrene series, the side chains of which were partially or completely degraded, have been obtained by the action of oxidizing agents on sterols or bile acids, their derivatives, degradation products or conversion products, which contained free secondary nuclear hydroxyl or carbonyl groups, particularly in 3-position.

It has now been found that oxidation products of the dimethyl-cyclopentano-polyhydrophenanthrene series surprisingly may also be obtained if compounds of the said series containing any desired side chain in 17-position and, in rings A and B, merely carbon double bonds and/or free or substituted tertiary hydroxyl groups, are treated with oxidizing agents, such as chromic acid, permanganates, peroxides, lead tetracylates, and the like, if desired, with temporary protection of nuclear double bonds which may be present, or if the oxidation is carried out by electrical means and/or with oxygen in the presence of oxygen carriers, such as lead peroxide or vanadic acid, and if the resulting non-volatile products, formed by the complete or partial degradation of the side chain, are removed from the oxidation mixture. To the oxidation mixture furthermore compounds catalyzing the oxidation may be added, for example halogens or strong inorganic acids, such as sulphuric acids or perchloric acid. The temporary protection of nuclear double bonds is effected, if desired, for example by addition of halogen or hydrogen halide. After the oxidation, in order to re-establish the double bonds, agents which split off halogen or hydrogen halide are then allowed to act upon the oxidation products in any desired purifying stage. Such agents are, for example, zinc dust and acetic acid, zinc dust and methanol, alkali iodides, or catalytically excited hydrogen on the one hand, or tertiary bases, such as pyridine, dimethyl-aniline, as well as carboxylic acid salts or alkalis on the other. It is also possible to carry out the reaction without the protection of the nuclear double bonds, but in this case, in addition to the degradation of the side chain, oxygen may enter into the rings A and/or B. Thus, by use of chromic acid as oxidizing agent, compounds, for example with $\alpha:\beta$-unsaturated ketone groupings in the rings mentioned may be obtained.

The carboxylic acids resulting from partial oxidative degradation of the side chains, the carboxylic group of which is to be found in the side chain or in place of this latter, can be obtained from the oxidation mixture, for example in the form of their salts, with the help of alkaline substances, and the liberated free acids purified and isolated, for example, again by way of their salts and/or by recrystallization, by preparation of esters, amides, as well as, particularly, by a fractionating treatment, such as fractionating esterification of the free acids, fractionating saponification, sublimation or adsorption of the esterified acids, and the like.

The neutral, non-volatile carbonyl compounds, ketones and aldehydes, resulting from the partial or total degradation of the steroid side chains, are separated from each other, and from carbonyl free compounds, for example, after removal of acid and readily volatile components, by means of physical and/or chemical methods, for example, by use of ketone reagents, by fractional crystallization, adsorption, by high vacuum sublimation, and the like. As ketone reagents, use is preferably made of hydrazine or hydroxylamine, or of their derivatives, such as semicarbazide, thiosemicarbazide, aminoguanidine, phenylhydrazine, neutral or basic substituted acyl hydrazines, for example, the hydrochloride of trimethylamino-acetylhydrazine or of pyridino-acetylhydrazine, bisulphite, and so on. In separating the various homologous carbonyl compounds, it has been found particularly advantageous to make use of a merely partial reaction with carbonyl reagents which, in addition to the groups capable of condensation with the carbonyl groups, also contain salt forming groups, or groups capable of conversion into salt forming groups, and/or gradual splitting of the condensation products of such carbonyl reagents. The methods of separation mentioned can naturally be applied in combination with one another.

If unsaturated parent materials have been oxidized, for example, with chromic acid, the resulting polycarbonyl compounds may also be separated from one another and from the monocarbonyl compounds, carbonyl-free and acid reaction products, for example, by methods described, which are of themselves known.

Suitable parent substances for the oxidative degradation process are, for example, $\Delta^1$, $\Delta^2$, $\Delta^3$, $\Delta^4$, $\Delta^5$-cholestenes, -koprostenes, -sitostenes, -stigmastadienes, -cholenic acids or their homologues, or cholestane-5-ole, koprostane-5-ole, sitostane-5-ole, stigmastene-5-ole, 5-hydroxy cholanic acids or their homologues, as well as the corresponding ethers and esters, particularly those with hydrogen halides. In addition, derivatives or conversion products of the acids named find application, such as esters or amides, or compounds in which the carboxyl group has been replaced by a carbinol group. Use may also be made of any desired stereoisomers of the compounds mentioned. These parent materials are either known or may be prepared by methods of themselves known. It is obvious that mixtures of various sterols or bile acids with nuclear double bonds or tertiary nuclear hydroxyl groups may also serve as parent substances, provided only that they are identical in their nuclear structure; further parent materials are degradation products of sterols and bile acids, such as are obtained, for example, by only partial degradation of the side chains according to the present process.

If unsaturated compounds, for example, cholestenes, be used as parent materials, unsaturated process products are obtained; if the double bond be intermediarily protected compounds such as androstene-17-ones, pregnene-20-ones, nor-cholestene-25-ones, nor-cholestene-20-ones, cholenic acids, nor-cholenic acids, bis-nor-cholenic acids, etio-cholenic acids are obtained. If the process be carried out without protection of the double bond, corresponding diketones and keto-carboxylic acids may be isolated, for example, androstenediones, pregnenediones and keto-etiocholenic acids. On the other hand, if compounds having free or substituted tertiary hydroxyl groups are used as parent substances, such as cholestane-5-ole, 5-chloro- or 5-bromo-cholestane, correspondingly substituted products of the process are obtained, belonging, for example, to the androstane, pregnane, nor-cholestane, bisnor-cholan aldehyde, cholanic acid, or etio-cholanic acid series. These substituted products may be finally converted by the action of agents which split off water, acid or alcohol, if desired after action of agents causing reesterification and/or hydrolysation, into compounds which are also unsaturated in the rings A and B.

By the new process the oxidation products, resulting from partial or complete degradation of the side chains, are obtained in appreciably better yields than when, as described in the introduction, one starts from compounds which contain free or substituted secondary hydroxyl groups or keto groups in ring A or B. The new products are compounds of therapeutic value or may be converted into such.

*Example 1*

To a solution of 1 part of 5-chlorocholestane in 30 parts of glacial acetic acid, at 20° C., 1.4 parts of chromium trioxide, dissolved in acetic acid of 90% strength, are added gradually over a period of 4 hours whilst strongly stirring. The reaction mixture is stirred at the same temperature for a further 24 hours, when the excess of chromic acid is destroyed by addition of methanol and the solution is greatly concentrated in vacuo. The residue is diluted with water and is subjected to a vacuum steam distillation for a period of 1 hour. It is then exhaustively extracted with ether, and the ether solution is washed repeatedly with sulphuric acid of 10 per cent strength, n-soda solution and water. By the extraction with soda solution, sparingly soluble sodium salts are precipitated, from which it is possible to obtain 5-chloro-cholanic acid of the Formula I by repeated acidification and extraction with alkaline lye, as well as recrystallization from acetic acid or acetone. In the mother liquors, smaller quantities of 5-chloro-etiocholanic acid, of Formula II, are present.

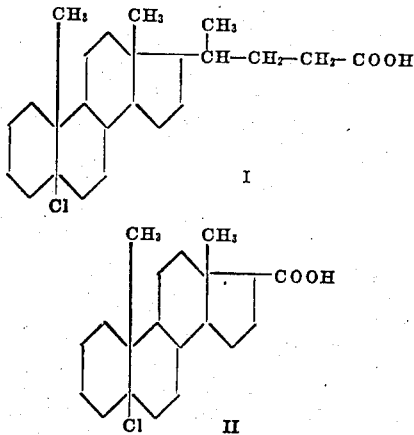

After evaporation of the ether solution, the residue is rubbed down with methyl alcohol, and thus the main quantity of the unchanged parent material is recovered. The alcoholic filtrate is evaporated, and the residue is taken up in alcohol. The solution thus obtained is reacted with the chloride of pyridinium acetic acid hydrazide in known manner. After separation of the non-carbonylic compounds, the mixture of the resulting water soluble hydrazones is subjected to a gradual splitting, the ketones liberated from time to time by varying hydrogen ion concentrations being extracted. Thus, if desired in combination with fractionated high vacuum sublimation, it is possible to separate ketones such as 5-chloro-androstane-17-one of Formula III, 5-chloro-pregnane-20-one of Formula IV, 5-chloro-norcholestane-20-one of Formula V, and 5-chloro-norcholestane-25-one of Formula VI.

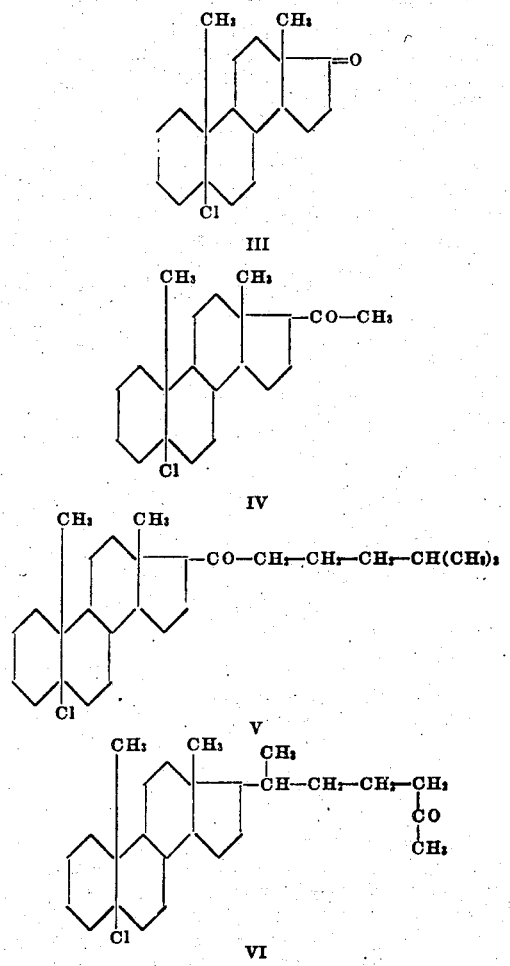

The salt of a basically substituted acetyl hydrazine may be equally well replaced by other ketone reagents, such as semicarazide acetate. It is also possible to make use of other purifying or separation methods, for example, fractional crystallization or sublimation.

If 5-chlorositostane or 5-chlorostigmastene be oxidized in an analogous manner, the same end products are obtained. On the other hand, if parent materials be used which, for example, possess in the 5-position a hydroxyl group esterified by another acid radical, or an etherified hydroxyl group, for example, a bromine atom, an acyloxy or an alkoxy group, correspondingly substituted end products are obtained. They may all be converted into unsaturated compounds by means of the action of agents which split off acid, alcohol or phenol, for example, by the action of agents which split off hydrogen halide.

On the other hand, if, for example, 5-hydroxy-cholestane, 5-hydroxy-sitostane or 5-hydroxy-stigmastene (obtained, for instance, from the 4:5- or 5:6-unsaturated compounds by the action of per-phthalic or per-benzoic acid and catalytic hydrogenation) be used as parent substance, the corresponding 5-hydroxy derivatives are obtained. By the action of agents which split off water, these may be converted into the corresponding unsaturated compounds.

The oxidation described may also be carried out after addition of halogen, such as chlorine or bromine, or of strong inorganic acids, for example, sulphuric acid or perchloric acid: in such cases often particularly good yields are obtained.

*Example 2*

$\Delta^4$-cholestene in glacial acetic acid solution is converted into 4:5-dibromo-cholestene by adding slowly a solution of bromine in acetic acid.

1 part of 4:5-dibromo-cholestene thus obtained in 32 parts of glacial acetic acid is heated at 25° C. with vigorous stirring. In the course of 4 hours, 1.2 parts of chromium trioxide, dissolved in glacial acetic acid or in solid form, are added gradually, and stirring is continued at the temperature stated for a further 16 hours. The excess of chromic acid is destroyed by addition of methanol, and the solution is greatly concentrated in vacuo. The residue is diluted with water and is subjected to a vacuum steam distillation for a period of one hour. It is then exhaustively extracted with ether, and the ether solution is washed repeatedly with sulphuric acid of 10 per cent strength, saturated aqueous sodium bicarbonate solution and water. After evaporation of the ether solution the residue is taken up in acetic acid of 95 per cent strength and the solution is stirred vigorously at room temperature for ten hours with zinc dust, to split off the bromine. The reaction mixture is then filtered with suction, and the acetic acid solution is diluted with a large volume of water, extracted with ether and the ether solution is washed with water and n-sodium hydroxide solution, the sparingly soluble sodium salts of the homologous carboxylic acids of the Formulae VII-X being precipitated.

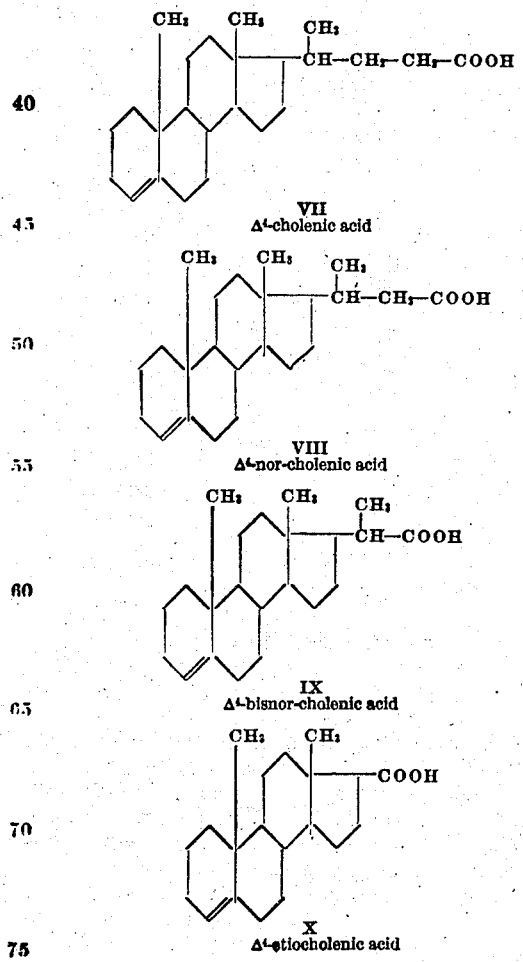

They are separated, for example, by a fractionating treatment like the conversion into the methyl esters with an unsufficient amount of diazomethane and/or subsequent fractionating saponification or chromatographic analysis of the methyl esters.

The ether solution is again washed with a large volume of water and evaporated; the residue is rubbed down with methyl alcohol, and thus the greater quantity of the parent material which has been unchanged in the side chain, $\Delta^4$-cholestene, is removed. The filtrate is free from solvent in vacuo, and the residual oil is taken up in a petroleum ether-benzene mixture. This solution is now subjected to a chromatographic analysis, using standardized aluminium oxide. It is thus possible to separate the four following homologous unsaturated side chain ketones, Formulae XI—XIV.

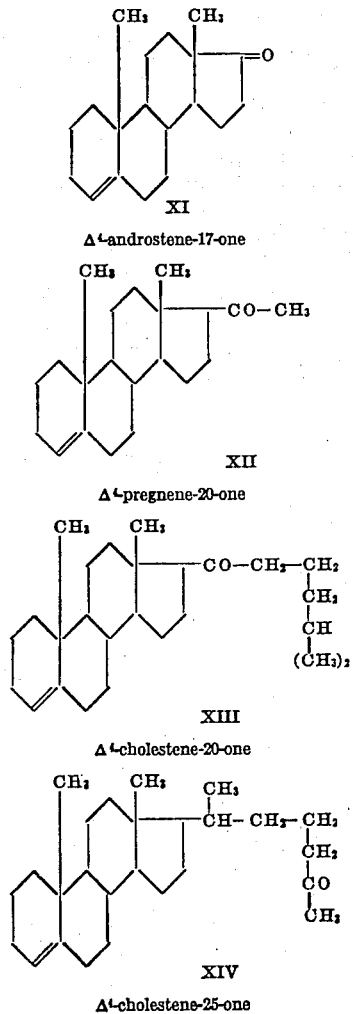

XI
$\Delta^4$-androstene-17-one

XII
$\Delta^4$-pregnene-20-one

XIII
$\Delta^4$-cholestene-20-one

XIV
$\Delta^4$-cholestene-25-one

These compounds may be separated one from another and isolated analogously to Example 1, using a ketone reagent yielding water-soluble derivatives.

The same end products are obtained if the double bond of the $\Delta^4$-cholestene is intermediarily protected, for example, by chlorination or addition of hydrogen halide. Furthermore, in place of $\Delta^4$-cholestene, for example, $\Delta^4$-sitostene, $\Delta^{4:22}$-stigmastadiene, etc., viz. their halogen or hydrogen halide addition products may be used as starting materials. Finally, the same end products are obtained from the 5-halogen derivatives obtained according to Example 1, by treatment with, for example, potassium acetate.

If, instead of $\Delta^4$-cholestene or its halogen or halogen halide addition products, $\Delta^5$-cholestene be used as parent material, the corresponding 5:6-unsaturated compounds are obtained in fully analogous manner.

*Example 3*

0.7 part of $\Delta^4$-cholestene is oxidized with chromic acid as described in Example 2. After the excess of chromic acid has been destroyed the reaction solution is evaporated in vacuo and the residue is extracted with ether. The acid portions of the extract are removed with caustic soda. Among other substances, the following ketocarboxylic acids may be obtained in the manner described above:

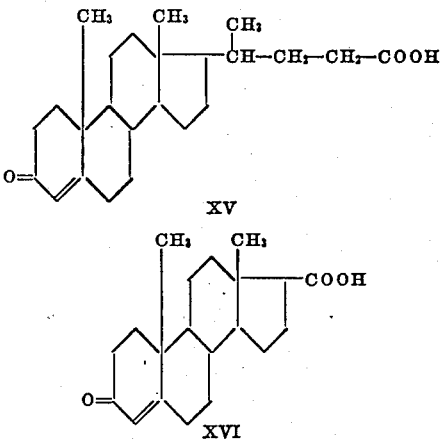

XV

XVI

The residual ethereal solution, containing the neutral portions, is shaken out 10 times with sulphuric acid of 70 per cent strength. The portion which still remains dissolved in the ether may be separated as described in Example 2 into monocarbonyl compounds and unchanged parent material. The polycarbonyl compounds are contained in the acid extracts. These are precipitated by addition of water and are extracted then with ether. The residue from these ethereal solutions is now worked up in a method of itself known. Thus, for example, it may be reacted with the chloride of trimethylamino acetic acid hydrazide. The water-soluble hydrazones obtained are subjected to a fractional cleavage by addition of ever increasing quantities of mineral acid. If desired, in combination with a chromatographic purification and fractional crystallization, the four homologues diketones, Formulae XVII-XX, may be isolated.

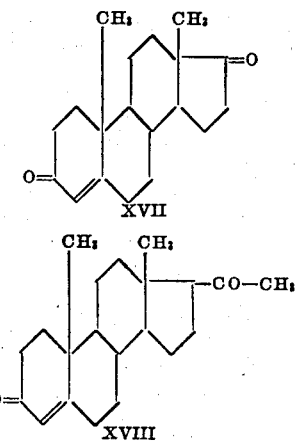

XVII

XVIII

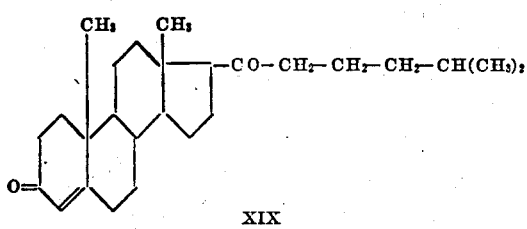

XIX

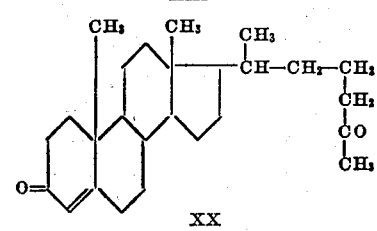

XX

Instead of using acid, the dicarbonyl compounds may be separated, for example, also by means of their particularly sparingly soluble diketo derivatives, such as their semicarbazones.

What we claim is:

1. The dimethyl cyclopentanopolyhydrophenanthrene compounds containing in the 17-position an oxo-group and in the rings A and B only a carbon double bond.

2. The dimethyl cyclopentanopolyhydrophenanthrene compounds containing in the 17-position an oxo-group and in the rings A and B only a carbon double bond in 4:5-position.

3. The $\Delta^4$-androstene-17-one of the formula:

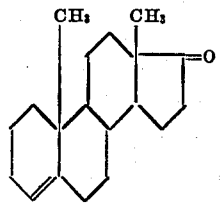

KARL MIESCHER.
ALBERT WETTSTEIN.